UNITED STATES PATENT OFFICE.

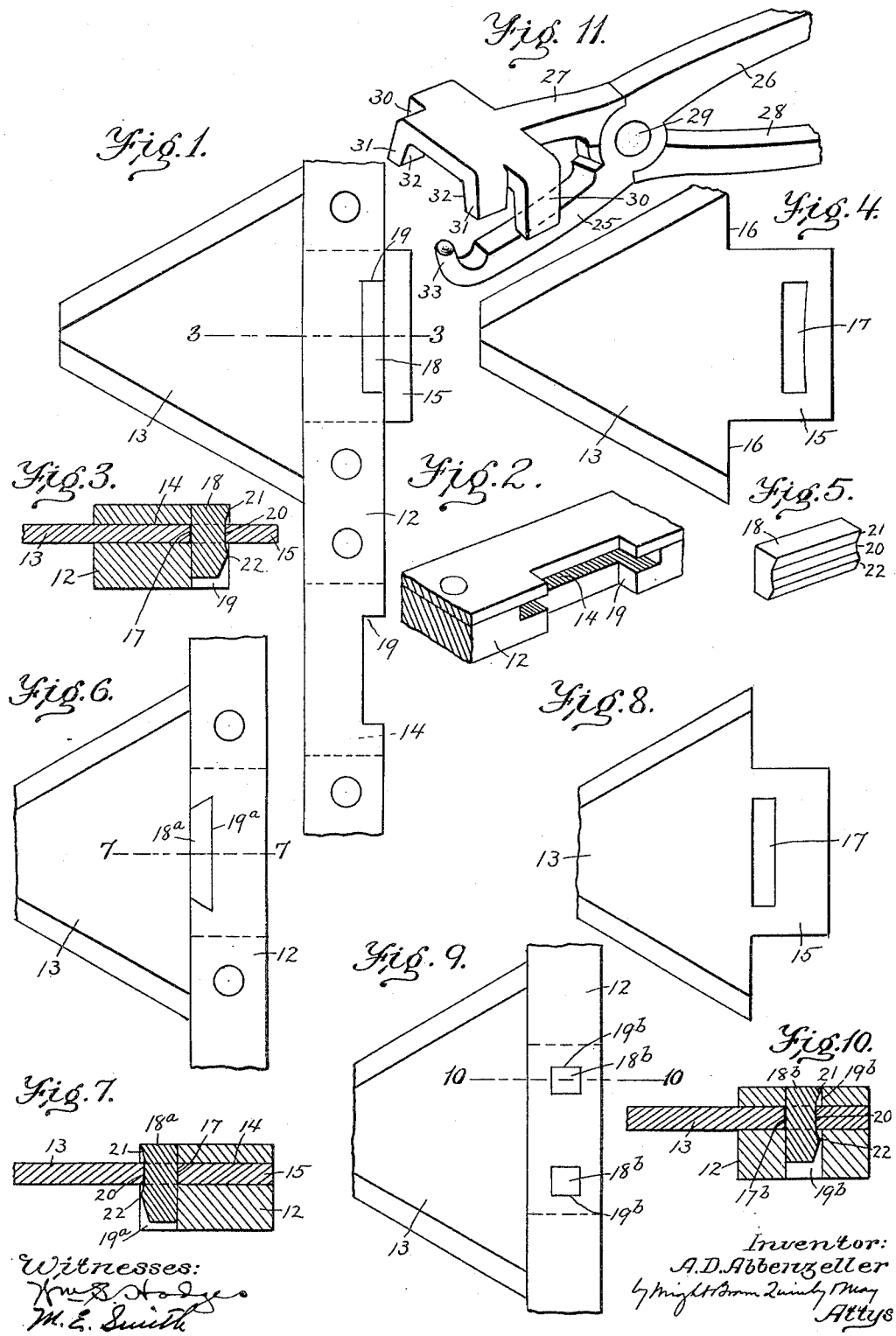

ALFRED D. ABBENZELLER, OF RANDOLPH, MASSACHUSETTS, ASSIGNOR TO BROCKTON MOWING MACHINE CUTTER BAR COMPANY, OF BROCKTON, MASSACHUSETTS, A CORPORATION OF MASSACHUSETTS.

CUTTER-BAR FOR MOWING-MACHINES.

1,081,078.  Specification of Letters Patent.  Patented Dec. 9, 1913.

Application filed March 12, 1913. Serial No. 753,820.

*To all whom it may concern:*

Be it known that I, ALFRED D. ABBENZELLER, a citizen of the United States, and a resident of Randolph, in the county of Norfolk and State of Massachusetts, have invented certain new and useful Improvements in Cutter-Bars for Mowing-Machines, of which the following is a specification.

This invention relates to cutter bars for mowing machines and reapers in which provision is made for the ready detachment of the knives or cutters from the bar by which they are reciprocated.

The invention has for its object to provide an improved means for detachably securing each cutter independently to the bar, so that any cutter can be readily removed for sharpening, or in case of breakage, and returned to place or replaced by a new one independently of the other cutters.

The invention consists in the improvements which I will now proceed to describe and claim.

Of the accompanying drawings:—Figure 1 represents a top plan view of a portion of a cutter bar embodying my invention, and a cutter secured thereto. Fig. 2 represents a perspective view of a portion of the bar. Fig. 3 represents an enlarged section on line 3—3 of Fig. 1. Fig. 4 represents a plan view of one of the cutters. Fig. 5 represents a perspective view of the locking key shown in Figs. 1 and 3. Fig. 6 represents a top plan view of a portion of a cutter bar showing a different embodiment of the invention. Fig. 7 represents an enlarged section on line 7—7 of Fig. 6. Fig. 8 represents a plan view of the cutter shown in Figs. 6 and 7. Fig. 9 represents a plan view of a modified construction. Fig. 10 represents a section on line 10—10, Fig. 9. Fig. 11 represents a perspective view of a tool which may be used to remove the keys from the embodiment of the invention shown by Figs. 1 to 5 inclusive.

The same reference characters indicate the same parts in all the figures.

In the drawings:—12 represents a cutter bar which is adapted to support a series of mowing machine cutters 13, and to be reciprocated on the finger bar of the machine as usual. The bar 12 is provided with a series of transverse sockets 14 extending horizontally from the front to the rear side of the bar, each socket being adapted to receive a shank 15 formed on a cutter 13, the back of the cutter being provided with shoulders 16 which bear on the front side of the bar 12 when the cutter is in place. In the shank 15 is formed a slot 17 so arranged that when the shank is in place in its socket, the slot will be exposed and adapted to receive a locking key 18. The relative arrangement of the parts described is such that when the key is inserted in the slot, it will engage the bar 12 in such manner as to prevent the withdrawal of the shank 15 from its socket.

In the embodiment of my invention shown in Figs. 1 to 5, the key performs the described function by bearing on the rear side of the bar 12, the length of the key being such that its upper and lower ends project from opposite sides of the shank. The bar 12 is preferably provided with recesses 19, which are arranged to receive the keys 18, each recess being of such form that a key inserted in it will not project to any appreciable or objectionable extent from the surfaces of the bar, so that the exposed surfaces of the key will practically constitute continuations or portions of the surfaces of the bar. The key 18 is formed to be interlocked with the shank 15 against endwise displacement by the operation of inserting the key in the slot 17. As here shown, the key is approximately wedge-shaped, that is to say, its outer end is somewhat thicker than its inner end, there being a gradual decrease in the thickness of the key along portions of its length from its outer to its inner end. The outer side of the key is provided with a slightly recessed portion 20, which I call a seat. The outer side of the key is provided above the seat with a protuberance 21, and below the seat with a protuberance 22. The portions of the key on which the protuberances 21 and 22 are formed are somewhat thicker than the width of the slot 17, while the portion of the key on which the seat 20 is formed is practically equal in thickness to the width of the slot. When the key is inserted in the slot, its narrower inner end enters the slot freely. The protuberance 22 in passing through the slot experiences sufficient resistance to require the application of a considerable degree of force, the passage of the protuberance through the slot being attended by a slight outward yielding of the corresponding edge of the slot, or a slight compression of the key, or both. When the key is in place as shown in Fig. 3, the protuberance 22 being below the shank 15, the key is interlocked with the shank in such manner that it cannot be moved outwardly without the application of force practically equal to that which inserted the key in the slot. The outer end of the key having the protuberance 21 is sufficiently thick to prevent the key from moving downwardly from the position shown in Fig. 3. It will be seen, therefore, that the operation of inserting the key in the slot securely locks the key to the shank 15 against any possibility of accidental displacement in either direction. The cutter may be removed by striking the lower end of the key with sufficient force to drive it upwardly through the slot and then withdrawing the shank 15 from the socket 14.

In the embodiment of my invention shown in Figs. 6, 7 and 8, the key-receiving recesses are formed in the front side of the bar 12, one of said recesses designated by the reference numeral 19$^a$ being represented. Said recess is of dovetail form and is occupied by a key 18$^a$ of corresponding form, the outer side of said key having the seat 20 and protuberances 21 and 22. The cutter shank 15 is in this case shorter than the shank shown in Figs. 1, 3 and 4, so that its outer end is flush with the rear side of the bar 12, the slot 17 being located in position to coincide with the dovetail recess 19$^a$. It will be seen that the dovetail form of the recess 19$^a$ and of the key 18$^a$ enables the key, by the bearing of its ends against the ends of the recess, to prevent forward displacement of the cutter, the object of this construction being to prevent any projection of the cutter shank from the cutter bar. The key 18 is preferably shorter than the thickness of the bar 12, as shown by Figs. 3 and 7, so that the inner end of the key is above the under side of the bar when the key is in place. Provision is thus made for slightly lowering the key to compensate for wear of the key and the edge of the slot 17 on which it bears, without causing a projection of the inner end of the key below the bar.

Figs. 9 and 10 show a modification in which the cutter bar is provided with sockets 19$^b$ and the cutter shank with slots 17$^b$ coinciding with said sockets, the slots being narrower than the sockets, so that keys 18$^b$ driven into the sockets and slots are adapted to engage the rear edges of the slots as shown by Fig. 10. The keys 18 formed to operate like the keys 18. Two sockets 19$^b$ may be provided for each cutter, the cutter shank being provided with two slots 17$^b$, and secured by two keys 18$^b$. The edge of the elongated slot 17 which engages the seat 20 may be curved to make it slightly resilient as shown by Fig. 4.

The keys 18 in the construction shown by Figs. 1 to 5 may be removed by the tool represented by Fig. 11, said tool comprising a jaw 25 having a handle 26, and a jaw 27 having a handle 28, said jaws being pivoted together at 29, and the arrangement being such that when the handles are pressed toward each other, the jaws are also pressed toward each other. The jaw 27 is provided with two downwardly projecting gage ears 30 adapted to bear on opposite ends of the rearwardly projecting portion of the cutter shank 15, Fig. 1, and with downwardly projecting key-engaging ears 31 having oppositely inclined inner faces 32. The jaw 25 is provided with an upwardly projecting terminal 33. When the gage ears are applied to the ends of the projecting portion of the shank 15, the inclined faces of the key-engaging ears are directly over the ends of the key 18. When the jaws 25 and 27 are pressed together the terminal 33 bears on the lower end of the key 18 and presses the same upwardly between the inclined faces 32, the upper end of the key being wedged between said faces and frictionally retained thereby, so that when the tool is removed, the removed key remains in contact with it.

What I claim and desire to secure by Letters Patent is:—

1. In a device of the character described, a cutter bar having a transverse shank-receiving socket, a cutter blade having a shank formed to enter said socket, said shank being provided with a slot, and a locking key formed to enter said slot to prevent withdrawal of the shank from the socket, said key having means on one face thereof to engage the shank above and below said slot.

2. In a device of the character described, a cutter bar having a transverse shank-receiving socket, a cutter blade having a shank to enter said socket, said shank being provided with a slot, and a locking key to enter said slot to prevent withdrawal of said shank, said key having a seat formed in one face thereof to engage one edge of the slot and projections above and below said seat to engage said shank.

3. In a device of the character described, a cutter bar having a transverse shank-receiving socket and a recess in one edge extending across said socket, a cutter having a shank formed to enter said socket, said shank being provided with a slot to coincide with said recess, and a locking key formed to enter said slot and recess to retain said shank in said socket, said key having projections on one face thereof to engage the upper and lower sides of said shank to prevent removal of said key.

4. In a device of the character described, a cutter bar having a transverse shank-receiving socket and a recess in one edge of the cutter bar extending across said socket, a cutter having a shank formed to enter said socket, said shank being provided with a slot to coincide with said recess, and a locking key adapted to enter said slot and recess to retain said shank in the socket, said key having projections on one face thereof to engage the upper and lower sides of said shank to prevent the removal of said key.

5. In a device of the character described, a cutter bar having a transverse shank-receiving socket and a recess in one edge extending across said socket, a cutter having a shank formed to enter said socket, said shank being provided with a slot to coincide with said recess, and a locking key adapted to enter said slot and recess to retain said shank in the socket, said key having a seat on one face to engage one edge of said slot and projections above and below said seat to engage the upper and lower sides of said shank to retain said key in position.

6. A device of the character described, a cutter bar having a transverse shank-receiving socket, and a dovetailed recess in its front side, a cutter having a shank formed to enter said socket and provided with a slot to coincide with said recess when the cutter is in position, and a locking key formed to enter said recess and slot to prevent removal of the shank from the socket, said key having a seat in one face to engage said cutter to prevent removal of said key.

In testimony whereof I have affixed my signature, in presence of two witnesses.

ALFRED D. ABBENZELLER.

Witnesses:
C. F. Brown,
P. W. Pezzetti.

Copies of this patent may be obtained for five cents each, by addressing the "Commissioner of Patents, Washington, D. C."